United States Patent
Yamazaki et al.

(10) Patent No.: US 10,540,011 B2
(45) Date of Patent: Jan. 21, 2020

(54) APPARATUS, METHOD, AND PROGRAM PRODUCT TO REDUCE NOISE

(71) Applicant: LENOVO (Singapore) PTE. LTD., New Tech Park (SG)

(72) Inventors: Mitsuhiro Yamazaki, Yokohama (JP); Fusanobu Nakamura, Yamato (JP); Yasushi Tsukamoto, Yamato (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 352 days.

(21) Appl. No.: 15/361,310

(22) Filed: Nov. 25, 2016

(65) Prior Publication Data
US 2017/0147068 A1  May 25, 2017

(30) Foreign Application Priority Data
Nov. 24, 2015 (JP) .................. 2015-229128

(51) Int. Cl.
*G06F 3/033* (2013.01)
*G09G 5/08* (2006.01)
*G06F 3/01* (2006.01)
*G06F 3/0481* (2013.01)

(52) U.S. Cl.
CPC .......... *G06F 3/016* (2013.01); *G06F 3/04812* (2013.01)

(58) Field of Classification Search
CPC ............................. G06F 3/016; G06F 3/04812
See application file for complete search history.

(56) References Cited

U.S. PATENT DOCUMENTS

2014/0160064 A1* 6/2014 Yairi .................. G06F 3/04895
                                                    345/174
2015/0227280 A1* 8/2015 Westerman ............ G06F 3/016
                                                    715/769

FOREIGN PATENT DOCUMENTS

| JP | 09026850 A | 1/1997 |
| JP | 2001282406 A | 10/2001 |
| JP | 2003067136 A1 | 3/2003 |
| JP | 2003283615 A | 10/2003 |
| JP | 2008052573 A | 3/2008 |
| WO | 2013176490 A1 | 11/2013 |

OTHER PUBLICATIONS

I. Ikeda et al., "A Tactile Sensation Feedback Method for Virtual Objects Based on Virtual Directional Force and Synchronized Visual Effects", ISPJ SIG Technical Report, vol. 2015-MUS-106 No. 2, vol. 2015-EC-35 No. 2, Mar. 2, 2015, 8 pages.

* cited by examiner

*Primary Examiner* — Insa Sadio
(74) *Attorney, Agent, or Firm* — Kunzler Bean & Adamson (57) ABSTRACT

An apparatus, method, and program product that can reduce noise caused by haptic feedback are provided. One apparatus includes a display that displays a cursor. The apparatus includes an input device that detects a user operation and generates operation data for operating the cursor based on the user operation. The apparatus also includes a haptic feedback device that provides haptic feedback based on the operation of the cursor. The apparatus includes a control device that controls the operation of the cursor based on the operation data, and modifies the operation data to reduce noise caused by the haptic feedback during a time period in which the haptic feedback is generated.

17 Claims, 9 Drawing Sheets

APPARATUS, METHOD, AND PROGRAM PRODUCT TO REDUCE NOISE

FIELD

The subject matter disclosed herein relates to an apparatus, method, and program product to reduce noise.

BACKGROUND

Recent years have seen a growing tendency to reduce the size and weight of devices such as laptop personal computers or portable terminals for user convenience such as portability. Higher display resolution, reduced device size and weight, and the like have increased the burden on the user when operating the device while watching the screen. This has raised the need to enable the user to confirm the operation by means other than visual confirmation when using the device.

One of the nonvisual means by which the user can confirm the operation is feedback by a haptic device. The haptic device is included in a device such as a mobile phone, and can provide haptic feedback (e.g., vibration) to the user when a predetermined event occurs. The haptic pattern may be set for each event, and techniques of enabling the user to know what kind of event has occurred through haptic feedback without visually recognizing the event may be used.

SUMMARY

In view of the above, the present disclosure includes an apparatus, method, and program product that can reduce noise caused by haptic feedback.

In one embodiment, an apparatus includes a display that displays a cursor. The apparatus includes an input device that detects a user operation and generates operation data for operating the cursor based on the user operation. The apparatus also includes a haptic feedback device that provides haptic feedback based on the operation of the cursor. The apparatus includes a control device that controls the operation of the cursor based on the operation data, and modifies the operation data to reduce noise caused by the haptic feedback during a time period in which the haptic feedback is generated.

In one embodiment, the control device sets the operation data generated immediately preceding the time period as extrapolation data, and modifies the operation data to reduce the noise caused by the haptic feedback based on the extrapolation data. In some embodiments, the control device stops the operation of the cursor to reduce the noise caused by the haptic feedback during the time period in which the haptic feedback is generated. In certain embodiments, the control device alters a speed of the operation of the cursor based on the extrapolation data.

In various embodiments, the haptic feedback device provides the haptic feedback in response to the cursor changing shape as a result of the user operation. In some embodiments, the haptic feedback device provides the haptic feedback in response to the cursor being located in a predetermined display area of the display as a result of the user operation. In certain embodiments, the haptic feedback device provides the haptic feedback in response to the cursor moving from the display to another display as a result of the user operation. In one embodiment, the haptic feedback device provides the haptic feedback in response to the cursor reaching an access area of an object with a high access frequency as a result of the user operation.

In one embodiment, a method includes displaying a cursor on a display. The method also includes detecting a user operation and generating operation data for operating the cursor based on the user operation. The method includes providing haptic feedback based on the operation of the cursor. The method also includes controlling the operation of the cursor based on the operation data. The method includes modifying the operation data to reduce noise caused by the haptic feedback during a time period in which the haptic feedback is generated.

In another embodiment, a program product includes a computer readable storage medium that stores code executable by a processor. The executable code includes code to perform: displaying a cursor on a display; detecting a user operation and generating operation data for operating the cursor based on the user operation; providing haptic feedback based on the operation of the cursor; controlling the operation of the cursor based on the operation data; and modifying the operation data to reduce noise caused by the haptic feedback during a time period in which the haptic feedback is generated.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, embodiments will be described and explained with additional specificity and detail through the use of the accompanying drawings, in which.

DETAILED DESCRIPTION

Figure 1:
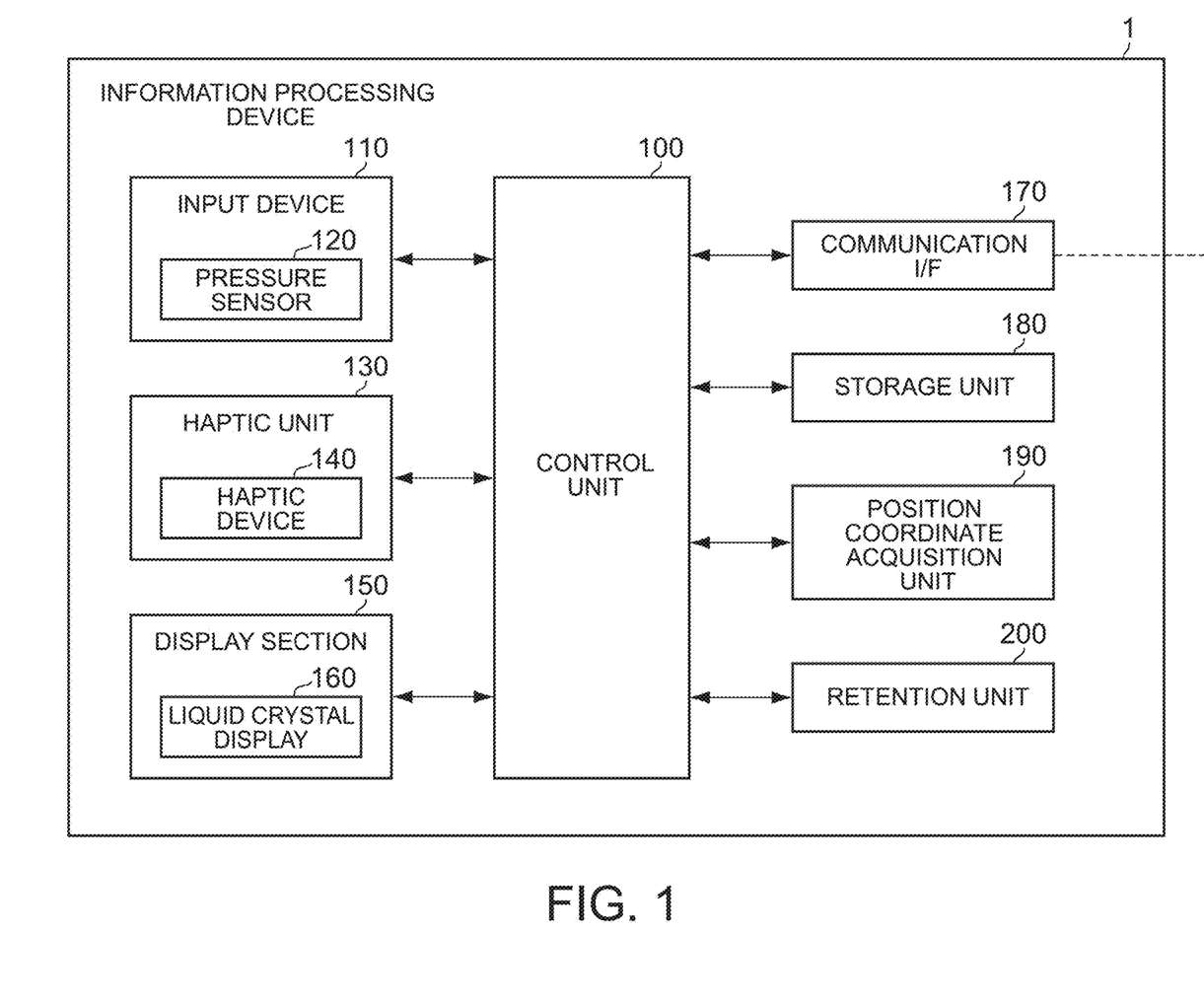
FIG. 1 is a block diagram of one embodiment of an information processing device.

The structure of an information processing device 1 according to one embodiment is described with reference to FIG. 1. Note that the information processing device 1 is not limited to the structure illustrated in FIG. 1, and may have any structure as long as hardware and functions capable of realizing this embodiment are included.

The information processing device 1 includes: a control unit 100 (e.g., control device) that executes a predetermined program to realize overall control of the information processing device 1; an input device 110 that outputs data based on a user operation; a haptic unit 130 (e.g., haptic feedback device) that provides haptic feedback based on a predetermined condition; a display unit 150 that includes a display using a panel such as a liquid crystal display or an organic electroluminescent ("EL") display; a communication interface ("I/F") 170 that provides connection to a network and an external device; a storage unit 180 that nonvolatilely stores programs and various data read by the information processing device 1; a position coordinate acquisition unit 190 that acquires position information of an input pointer such as a cursor; and a retention unit 200 that temporarily retains data output as a result of operating the input device 110 and the like.

The control unit 100 in the information processing device 1 executes a predetermined program to realize overall control of the information processing device 1. The control unit 100 operates with various functions constituting the information processing device 1, and performs processes based on the predetermined program. The control unit 100 may include read-only memory ("ROM") which is for reading various programs, random access memory ("RAM") used as working memory, and a central processing unit ("CPU").

The input device 110 in the information processing device 1 is a pointing device, and includes a pressure sensor 120 in this embodiment. Other elements constituting the input device 110 include a cover member having an operation surface and a printed control board including control circuitry, though not illustrated. When a force is applied to the cover operation surface of the input device, the pressure sensor detects the force, and operation data for the mouse cursor is generated based on the detected force and output as a signal. The input device 110 is not limited to the use of a pressure sensor, and may have any structure as long as a user operation on the input device 110 can be detected and the mouse cursor can be moved based on the detection data. For example, the input device 110 may be a touch panel.

Figure 3A:
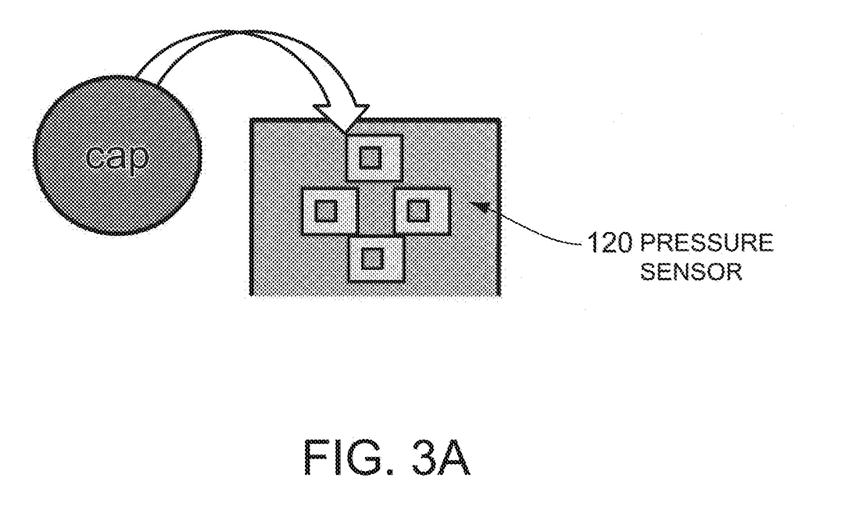
FIGS. 3A and 3B are diagrams illustrating one embodiment of a pressure sensor.
Figure 3B:
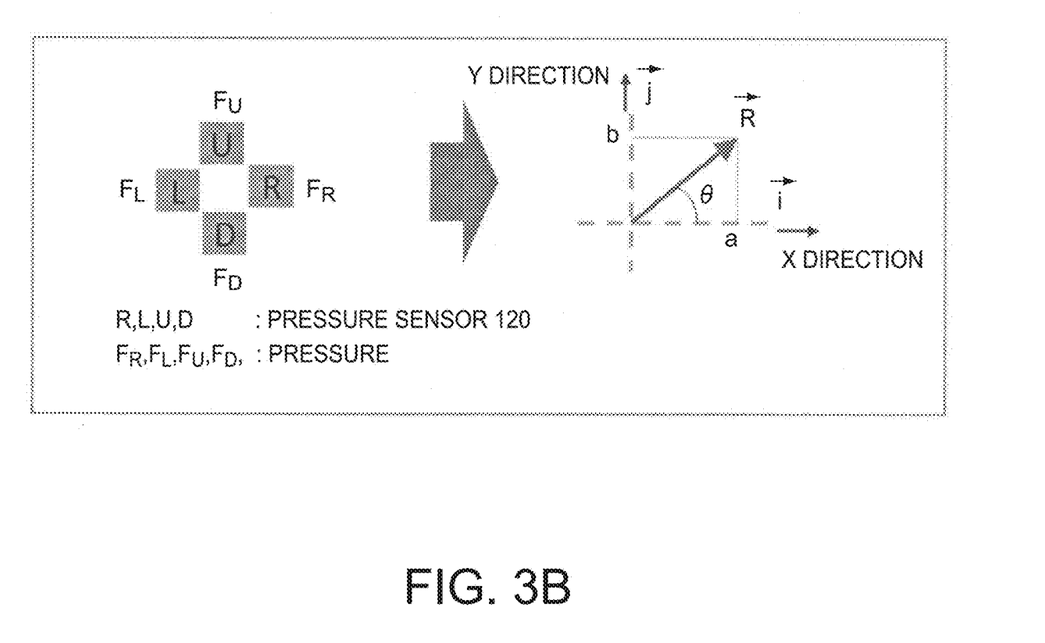

The pressure sensor used in certain embodiments is described in detail below. FIGS. 3A and 3B are diagrams illustrating one embodiment of a pressure sensor used in certain embodiments. FIG. 3A is a schematic diagram illustrating one embodiment of the input device 110. The pressure sensor used in this embodiment has four pressure sensors 120 covered by a cover (e.g., cap), and includes a printed control board including control circuitry though not illustrated. Here, all of the four pressure sensors 120 conform to the same standard. The cover (e.g., cap) is made of an aluminum alloy or the like as an example of a thin and firm material, but is not limited to such.

The principle of the pressure sensor 120 is described below, with reference to FIG. 3B. For example, consider the case of detecting the magnitude and direction of the force exerted on the pressure sensor 120 when the user performs an operation of scrolling the mouse cursor in the horizontal direction on the display screen. The pressure sensors 120 (U, R, D, L) are arranged as illustrated in FIG. 3B. First, the force exerted by the user operation is regarded as a vector with components in two directions, i.e. the horizontal x direction and the horizontal y direction.

Of the four pressure sensors 120 (U, R, D, L), the force in the horizontal x direction is detected by L and R, and the force in the horizontal y direction is detected by U and D. Let the pressures on the respective pressure sensors be FU, FR, FD, and FL. The vector sum in the moving direction of the mouse cursor according to the user operation can be given as follows (Equation 1).

$$\vec{R} = a\vec{i} + b\vec{j}$$

$$a = F_R - F_L, b = F_U - F_D \quad (1)$$

By the user operating the input device, the mouse cursor moves in the direction of R. The magnitude of R which is the synthesis pressure eventually output can be obtained as follows (Equation 2).

$$r^2 = |R|^2 = a^2 + b^2 \quad (2)$$

The obtained synthesis pressure R is the force output per unit time. The value of the synthesis pressure R varies depending on the pressure on the pressure sensor 120. The moving amount and speed of the mouse cursor operated by the user are calculated using Equations (1) and (2).

The haptic unit 130 in the information processing device 1 provides haptic feedback in the case where a preset event occurs. A haptic device included in the haptic unit 130 may employ a shape memory alloy ("SMA"), an eccentric rotating mass ("EMP") using a piezoelectric sensor, a linear resonant actuator ("LRA"), electro mechanical polymer ("ERM"), etc. The position of the haptic unit 130 is not particularly limited, but is preferably such a position where, when the user is using the input device 110, at least part of the user's hand is in contact with the haptic unit 130. For example, in the case of using a laptop PC, the haptic unit 130 may be situated near the home position of the keyboard, a palm rest, or the like.

The haptic unit 130 may be included in the input device 110. In any case, the haptic unit 130 may have any structure capable of operating with the control unit 100 to provide haptic feedback. When an event that requires the generation of haptic feedback occurs according to an operation on the input device 110, the haptic unit 130 generates haptic feedback based on a predetermined haptic generation timing. The haptic generation timing may be set for each event, where the vibration period, vibration strength, etc. of haptic feedback is varied.

The display unit 150 in the information processing device 1 includes a display 160 using a panel such as a liquid crystal display or an organic EL display.

The communication I/F 170 in the information processing device 1 is an interface for input and output of various information with an external device or an electronic device such as a computer via a network. The communication I/F 170 may be a USB port, a LAN port, a wireless LAN port, or the like, and may have any structure capable of transmission and reception of data with an external device.

The storage unit 180 in the information processing device 1 nonvolatilely stores programs and various data read by the information processing device 1. The storage unit 180 may be, for example, a hard disk drive ("HDD") that can retain various data when power is off.

The position coordinate acquisition unit 190 in the information processing device 1 acquires the position coordinate information of the mouse cursor on the display screen. The position coordinate acquisition unit 190 includes a dedicated application, which acquires the position coordinates of the mouse cursor based on an instruction from the control unit 100.

The retention unit 200 in the information processing device 1 retains the operation data of the mouse cursor from the input device 110, the position coordinate information of the mouse cursor acquired by the position coordinate acquisition unit 190, etc. The retained data can be read based on an instruction from the control unit 100. The retention unit 200 may be composed of an HDD, memory, or the like, as with the storage unit 180.

Figure 2:
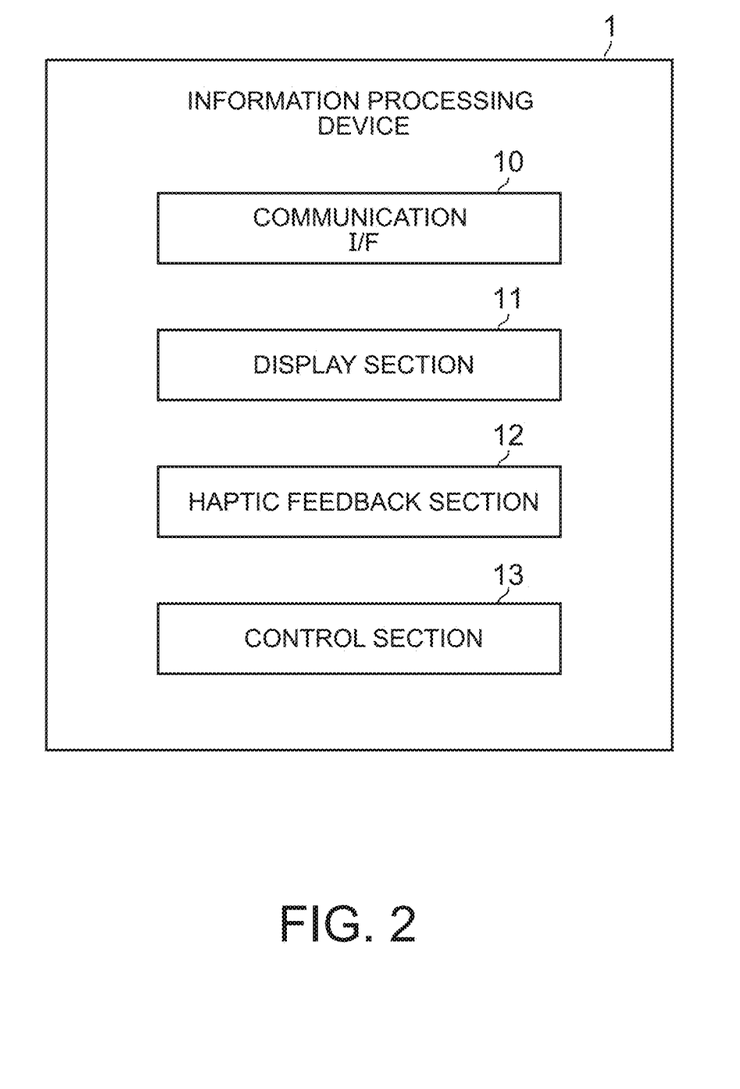
FIG. 2 is a functional block diagram of one embodiment of an information processing device.

FIG. 2 is a functional block diagram of one embodiment of the information processing device 1. The information processing device 1 according to this embodiment includes a display section 10, an input section 11, a haptic feedback section 12, and a control section 13.

The display section 10 in the information processing device 1 displays the mouse cursor on the display. The display section 10 can be realized by the control unit 100, the input device 110, the display unit 150, and the position coordinate acquisition unit 190.

The input section 11 in the information processing device 1 detects a user operation on the operation surface by the pressure sensor, and generates operation data for operating the mouse cursor based on the detection of the pressure sensor. Although the pressure sensor is used as one means of user operation detection in this embodiment, the present disclosure is not limited to the use of the pressure sensor as long as the user operation can be detected. The generated operation data is sent to the retention unit 200 as an output signal, and the control unit reads the operation data and performs a predetermined process as desired.

The input section 11 may include the control unit 100, the input device 110, and the retention unit 200.

The haptic feedback section 12 in the information processing device 1 provides haptic feedback when an event occurs on the mouse cursor. In detail, when an event occurs on the mouse cursor, the haptic feedback section 12 generates a haptic timing notification pulse, and generates and provides predetermined haptic feedback during the period of the notification pulse. Mouse cursor events and haptic feedback are described below. As an example, haptic feedback may be provided when the mouse cursor changes in shape, when the position coordinates of the mouse cursor reach a predetermined display boundary, when the mouse cursor moves from one display to another display, or when the position coordinates of the mouse cursor reach the access area of an object frequently accessed by the user. As another example, haptic feedback may be provided depending on the moving direction or moving amount of the mouse cursor. In detail, haptic feedback may be provided when the movement of the mouse cursor starts or stops, when the moving direction of the mouse cursor changes significantly, or when the moving amount of the mouse cursor per unit time is large (when the moving speed is high).

The pulse width or period of the haptic timing notification pulse may be changed depending on the type of event. The haptic feedback section 12 may include the control unit 100 and the haptic unit 130.

The control section 13 in the information processing device 1 corrects the operation data generated based on the sensor output and controls the operation of the mouse cursor accordingly, in the haptic feedback generation period. As mentioned earlier, noise caused by haptic feedback is likely to be superimposed on the output of the input device in the haptic generation period.

Hence, the operation data used in the haptic generation period may be corrected. The correction of the operation data may be performed as follows. As an example, operation data immediately preceding the occurrence of the predetermined event is read, and the read operation data is used as extrapolation data in the haptic generation period. As another example, the operation of the mouse cursor is deliberately stopped in the haptic generation period. As another example, by further changing the extrapolation data, the moving speed of the mouse cursor is decreased or increased in the haptic generation period.

In any case, the adverse effect of noise caused by haptic feedback on the operation of the mouse cursor may be reduced, thus suppressing an erroneous operation of the mouse cursor not intended by the user.

Figure 4A:
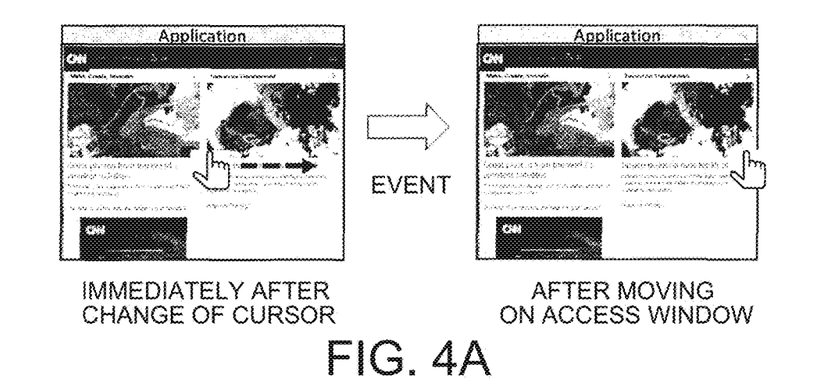
FIGS. 4A and 4B are diagrams illustrating one embodiment of a relationship between a cursor moving operation and haptic feedback.
Figure 4B:
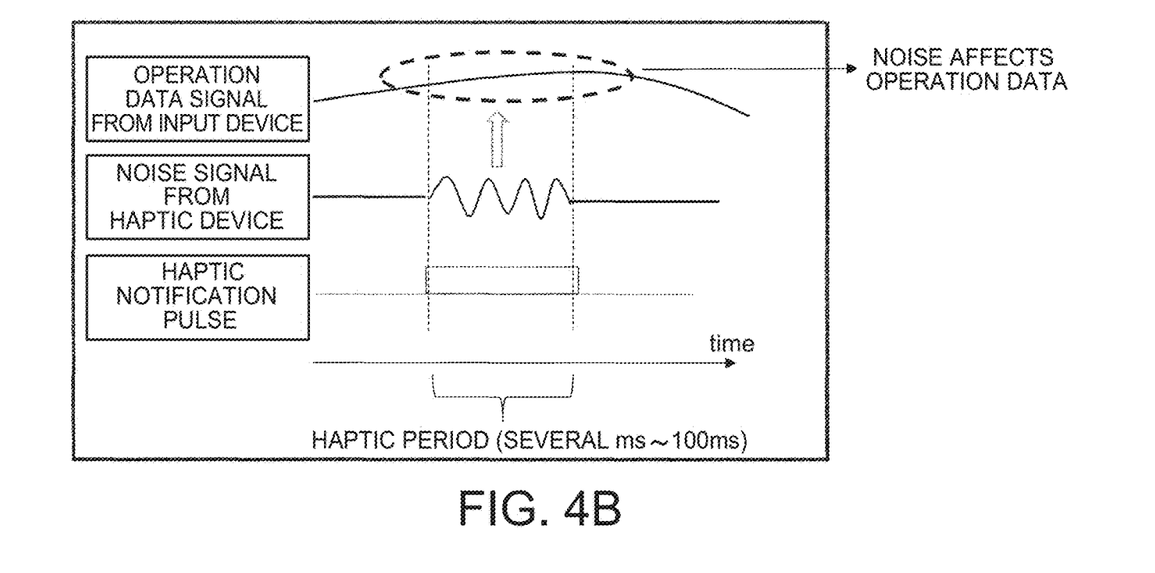
Figure 5A:
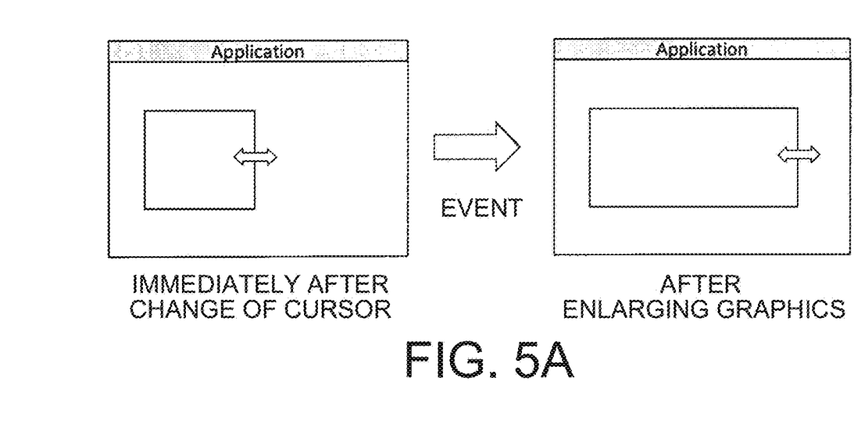
FIGS. 5A and 5B are diagrams illustrating one embodiment of a relationship between a continuous cursor operation and haptic feedback.
Figure 5B:
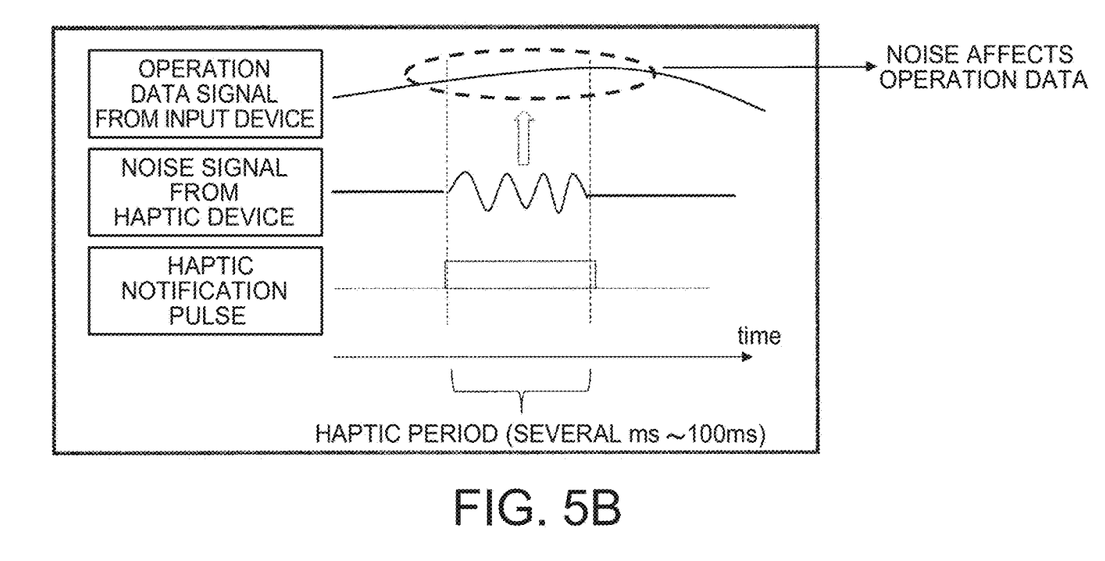

The following describes the relationship between mouse cursor moving operations and haptic feedback. FIGS. 4A and 4B are diagrams illustrating one embodiment of the relationship between a mouse cursor moving operation and haptic feedback, and FIGS. 5A and 5B are diagrams illustrating one embodiment of the relationship between the mouse cursor and haptic feedback when a predetermined operation is performed on an object.

FIGS. 4A and 4B illustrate situations where the user is viewing content in a predetermined web site or the like while moving the mouse cursor. Suppose, when the user moves the mouse cursor to predetermined content in FIG. 4A, the shape of the mouse cursor changes from an arrow to that illustrated in the drawing. FIG. 4B illustrates the operation data output from the input device, noise caused by haptic feedback, and haptic timing notification pulse in the event occurrence period.

When the shape of the mouse cursor changes from an arrow to that illustrated in the drawing, the haptic timing notification pulse is generated. With the generation of haptic feedback, noise caused by the haptic feedback affects the output of the input device. Since the operation data affected by such noise has a more irregular curve than the one illustrated in the drawing, the mouse cursor moves in a manner not intended by the user.

The haptic timing notification pulse is defined in several ms to 100 ms as illustrated in the drawing, and set to repeat this cycle at fixed intervals. Usually, haptic feedback is repeated at fixed intervals in the case where the event duration is long, whereas haptic feedback is generated only once in the case where the event duration is short. For example, if the event duration is 1 second, the haptic timing cycle is repeated two or three times.

FIGS. 5A and 5B illustrate situations where the user operates an object. When the user tries to operate a predetermined object in FIG. 5A, the shape of the mouse cursor changes from an arrow to that illustrated in the drawing. FIG. 5B is the same as FIG. 4B, and so its description is omitted.

When the shape of the mouse cursor changes from an arrow to that illustrated in the drawing, the haptic timing notification pulse is generated. With the generation of haptic feedback, noise caused by the haptic feedback affects the operation data from the input device. Since the operation data affected by such noise has a more irregular curve than the one illustrated in the drawing, the mouse cursor moves in a manner not intended by the user.

In each of FIGS. 4 and 5, the change of the shape of the mouse cursor is detected as an event, as a result of which haptic feedback is generated. Since there is a possibility that the operation of the mouse cursor in the haptic generation period deviates from the user's intention as described above, the operation data in the haptic generation period is changed as illustrated in FIG. 6.

Figure 6:
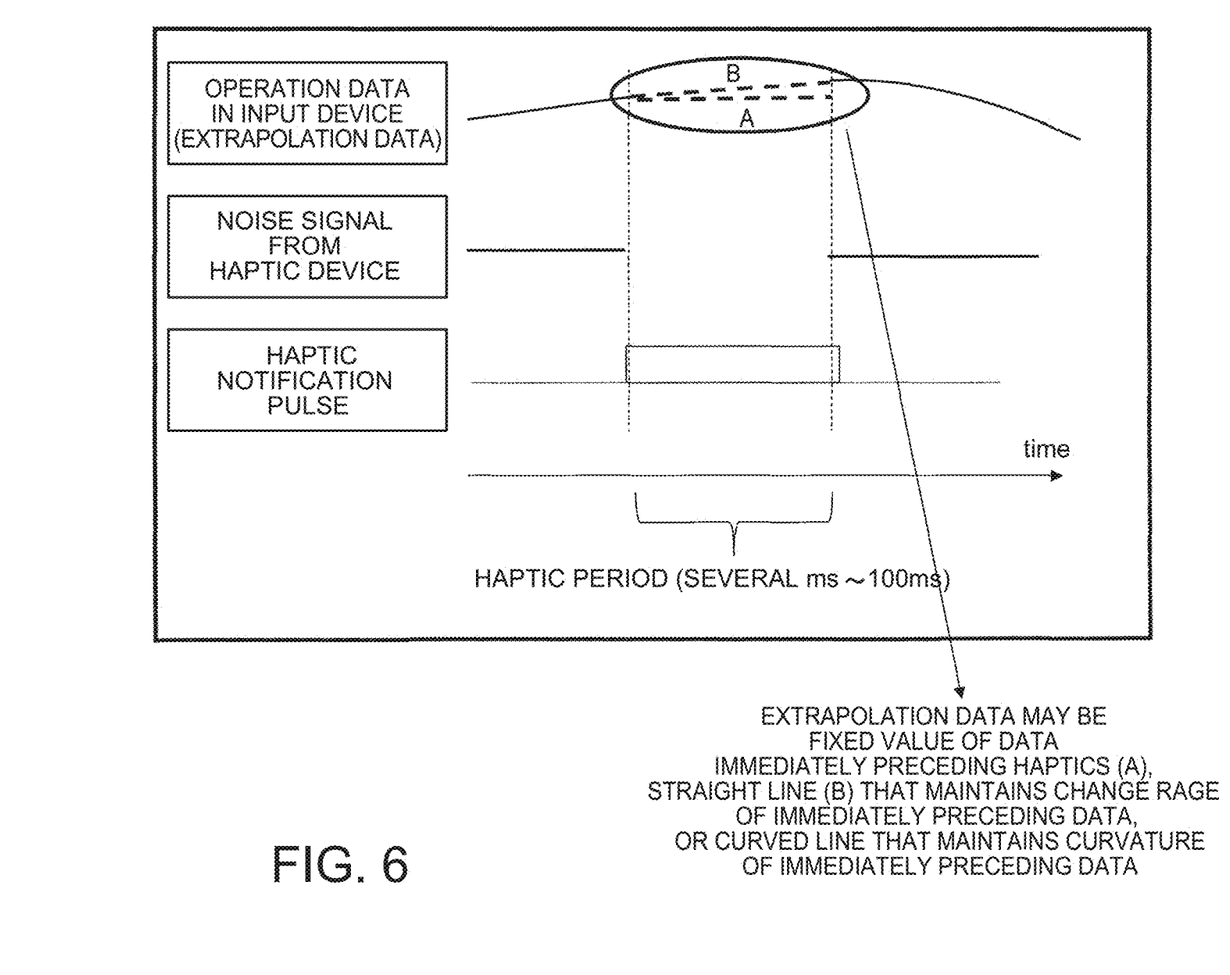
FIG. 6 is a diagram illustrating one embodiment of a cursor operation data replacement method.

FIG. 6 is a diagram illustrating one embodiment of a mouse cursor operation data replacement method. Using the operation data generated from the output of the input device in the haptic generation period is undesirable because haptic noise is superimposed on the output of the input device, as mentioned above. The data is therefore replaced as illustrated in FIG. 6.

The operation data in the haptic generation period in straight line A in FIG. 6 indicates a fixed value. Here, operation data immediately preceding (10 ms before in the drawing) the generation of haptic feedback is used as the fixed value in the haptic generation period. Thus, past operation data is used in the haptic generation period without reference to the output operation data. The operation data immediately preceding the generation of haptic feedback is not limited to the operation data 10 ms before the generation of haptic feedback, and may be selected using a predetermined threshold. The use of operation data as close in value to the operation data output in the haptic generation period as possible is preferable in order to enable the user to continue smooth mouse cursor operation. The extrapolation data is not limited to the fixed value of the data immediately preceding the generation of haptic feedback, and may be a straight line that maintains the change rate of the immediately preceding data or a curved line that maintains the curvature of the immediately preceding data, for smoother continuous operation. The operation data in the haptic generation period in straight line B in FIG. 6 indicates a value that maintains the change rate of the operation data immediately preceding the generation of haptic feedback.

Another example of the operation data replacement method is a method of deliberately stopping the operation of the mouse cursor in the haptic generation period. This has an effect of preventing unintended operation due to noise caused by haptic feedback. Alternatively, the operation speed of the mouse cursor may be decreased or increased after replacing the operation data with the past operation data in the haptic generation period. An available method of decreasing or increasing the operation speed of the mouse cursor is to take the product of the operation data and a specified coefficient k (k<1 when decreasing the operation speed, k>1 when increasing the operation speed).

In any case, an unintended operation of the mouse cursor caused by noise in the haptic generation period can be avoided by replacing the operation data. This is expected to improve user operability.

Figure 7:
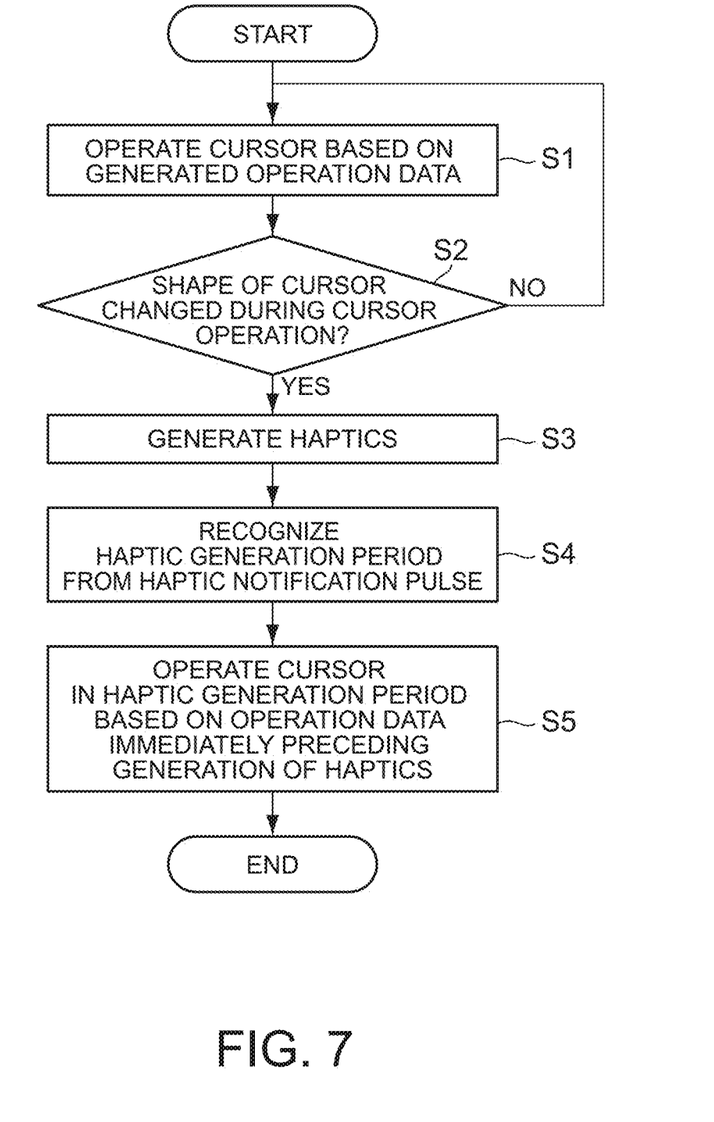
FIG. 7 is a flowchart illustrating a first embodiment of a method.

Flowcharts according to the embodiment of the present disclosure are described below. FIG. 7 illustrates a method of replacing operation data in response to haptic event occurrence, as a first embodiment. Note that the type of event is different in each of FIGS. 7, 8, and 9.

The mouse cursor is operated S1 based on operation data generated from the output of the pressure sensor. If the shape of the mouse cursor changes during the operation of the mouse cursor S2, the occurrence of an event is detected, and haptic feedback is generated S3. Here, the haptic generation period is recognized S4 from the haptic timing notification pulse.

With reference to the haptic timing notification pulse, the operation of the mouse cursor in the haptic generation period is performed S5 based on operation data immediately preceding the generation of haptic feedback. Since the output operation data in the haptic generation period is not referenced at all, the data may be held by a predetermined function.

Figure 8:
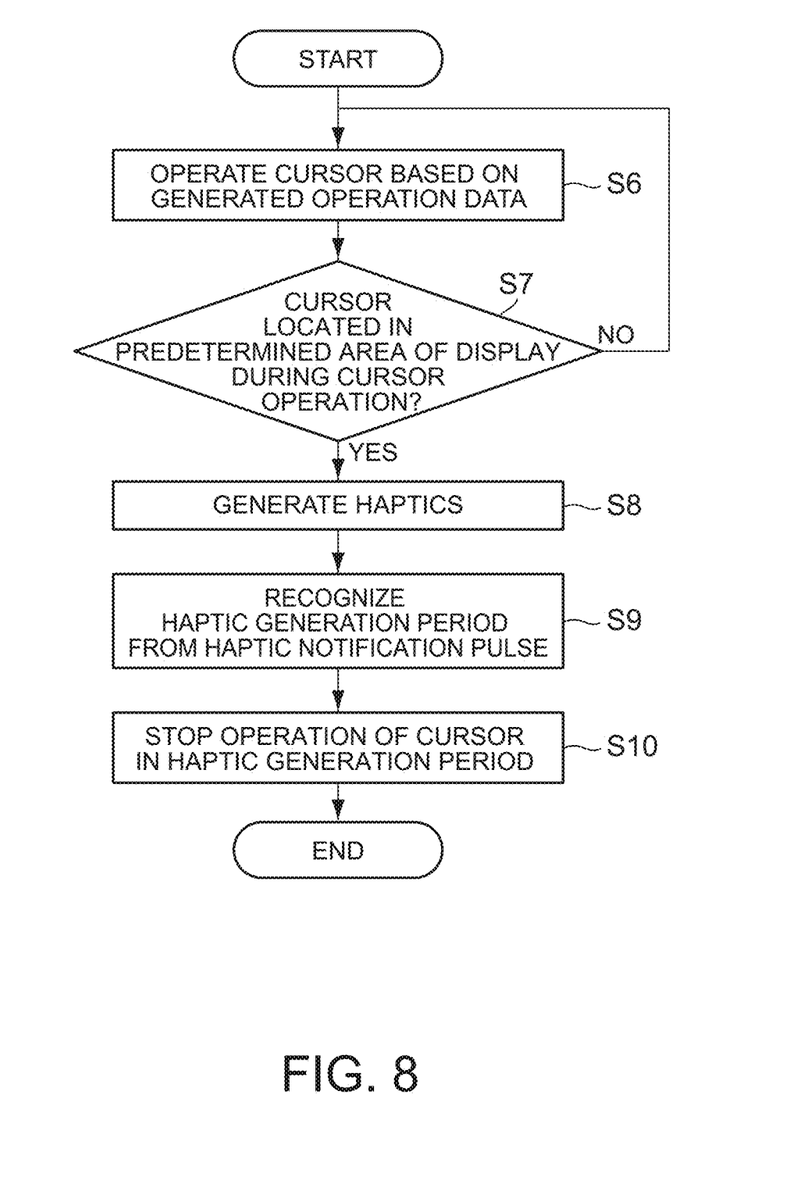
FIG. 8 is a flowchart illustrating a second embodiment of a method.

FIG. 8 illustrates a method of deliberately stopping the operation of the mouse cursor in the haptic period in response to haptic event occurrence, as a second embodiment.

The mouse cursor is operated S6 based on operation data generated from the output of the pressure sensor. If the mouse cursor is located in a predetermined area of the display during the operation of the mouse cursor S7, the occurrence of an event is detected, and haptic feedback is generated S8. The predetermined area of the display is, for example, a boundary area or an area to move to another display. Here, the haptic generation period is recognized S9 from the haptic timing notification pulse.

With reference to the haptic timing notification pulse, the operation of the mouse cursor in the haptic generation period is deliberately stopped S10. To deliberately stop the operation of the mouse cursor, the operation speed may be set to 0 by taking the product of the operation data currently output from the input device and coefficient 0, or the operation speed may be set to 0 by replacing the operation data with past operation data and then taking the product of the operation data and coefficient 0.

Figure 9:
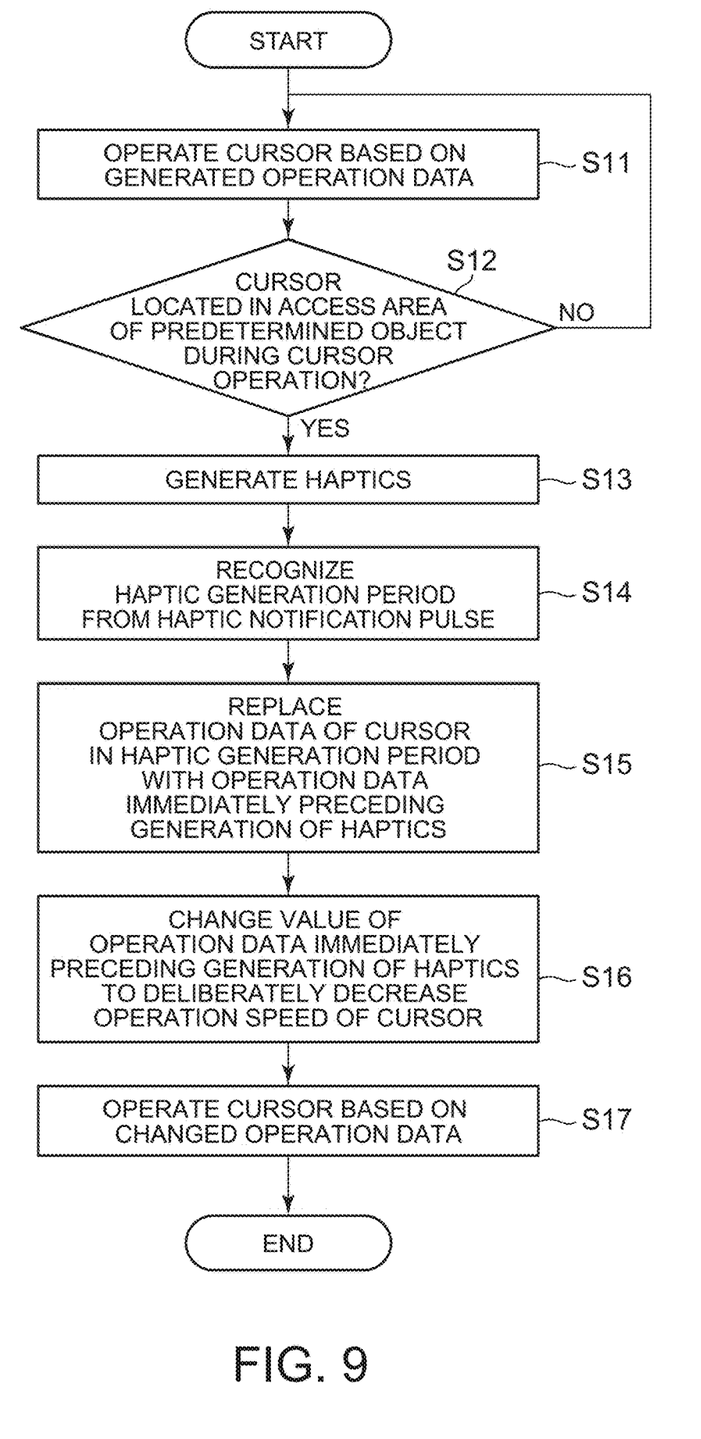
FIG. 9 is a flowchart illustrating a third embodiment of a method.

FIG. 9 illustrates a method of decreasing the operation speed of the mouse cursor in the haptic period in response to haptic event occurrence, as a third embodiment.

The mouse cursor is operated S11 based on operation data generated from the output of the pressure sensor. If the mouse cursor is located in the access area of a predetermined object during the operation of the mouse cursor S12, the occurrence of an event is detected, and haptic feedback is generated S13. The predetermined object is, for example, an icon frequently accessed by the user, and may be set optionally. Here, the haptic generation period is recognized S14 from the haptic timing notification pulse.

With reference to the haptic timing notification pulse, the operation data of the mouse cursor in the haptic generation period is replaced S15 with operation data immediately preceding the generation of haptic feedback. The value of the replaced operation data is then changed S16 so as to decrease the operation speed of the mouse cursor. The mouse cursor is moved S17 based on the changed operation data.

The decrease/increase of the moving speed of the mouse cursor is as described above. Upon the generation of haptic feedback when the mouse cursor reaches the access area of a predetermined object, a method such as deliberately decreasing the operation speed of the mouse cursor may be performed to improve operability specific to each individual user.

Certain embodiments of the present disclosure have been described above. Although the present disclosure has been described by way of specific examples, various modifications and changes may be made to the examples without departing from the spirit and scope of the claims.

For example, a modification may be made to the embodiment so that the haptic unit 130 is incorporated in the input device 110. When the user operates the mouse cursor, the user uses the input device. Hence, for example in the case where haptic feedback is generated while the user is operating the mouse cursor, it is preferable to provide haptic feedback to the input device itself.

The sensor included in the input device 110 is not limited to a pressure sensor. Any sensor capable of detecting the force of operation by the user may be used, such as a strain gauge sensor or a touch sensor.

According to the present disclosure, it is possible to provide an information processing device that can reliably eliminate input noise caused by haptic feedback which affects user operability.

What is claimed is:

1. An apparatus comprising:
   a display that displays a cursor;
   an input device that detects a user operation and generates operation data for operating the cursor based on the user operation;
   a haptic feedback device that provides haptic feedback based on the operation of the cursor; and
   a control device that:
   controls the operation of the cursor based on the operation data;

sets the operation data generated immediately preceding a time period as extrapolation data; and modifies the operation data based on the extrapolation data to reduce noise caused by the haptic feedback during the time period in which the haptic feedback is generated.

2. The apparatus of claim 1, wherein the control device stops the operation of the cursor to reduce the noise caused by the haptic feedback during the time period in which the haptic feedback is generated.

3. The apparatus of claim 1, wherein the control device alters a speed of the operation of the cursor based on the extrapolation data.

4. The apparatus of claim 1, wherein the haptic feedback device provides the haptic feedback in response to the cursor changing shape as a result of the user operation.

5. The apparatus of claim 1, wherein the haptic feedback device provides the haptic feedback in response to the cursor being located in a predetermined display area of the display as a result of the user operation.

6. The apparatus of claim 1, wherein the haptic feedback device provides the haptic feedback in response to the cursor moving from the display to another display as a result of the user operation.

7. The apparatus of claim 1, wherein the haptic feedback device provides the haptic feedback in response to the cursor reaching an access area of an object with a high access frequency as a result of the user operation.

8. A method comprising:
displaying a cursor on a display;
detecting a user operation and generating operation data for operating the cursor based on the user operation;
providing haptic feedback based on the operation of the cursor;
controlling the operation of the cursor based on the operation data;
setting the operation data generated immediately preceding a time period as extrapolation data; and
modifying the operation data based on the extrapolation data to reduce noise caused by the haptic feedback during the time period in which the haptic feedback is generated.

9. The method of claim 8, further comprising stopping the operation of the cursor to reduce the noise caused by the haptic feedback during the time period in which the haptic feedback is generated.

10. The method of claim 8, further comprising altering a speed of the operation of the cursor based on the extrapolation data.

11. The method of claim 8, further comprising providing the haptic feedback in response to the cursor changing shape as a result of the user operation.

12. The method of claim 8, further comprising providing the haptic feedback in response to the cursor being located in a predetermined display area of the display as a result of the user operation.

13. A program product comprising a non-transitory computer readable storage medium that stores code executable by a processor, the executable code comprising code to perform:
displaying a cursor on a display;
detecting a user operation and generating operation data for operating the cursor based on the user operation;
providing haptic feedback based on the operation of the cursor;
controlling the operation of the cursor based on the operation data;
setting the operation data generated immediately preceding a time period as extrapolation data; and
modifying the operation data based on the extrapolation data to reduce noise caused by the haptic feedback during the time period in which the haptic feedback is generated.

14. The program product of claim 13, wherein the executable code further comprises code to perform stopping the operation of the cursor to reduce the noise caused by the haptic feedback during the time period in which the haptic feedback is generated.

15. The program product of claim 13, wherein the executable code further comprises code to perform altering a speed of the operation of the cursor based on the extrapolation data.

16. The program product of claim 13, wherein the executable code further comprises code to perform providing the haptic feedback in response to the cursor changing shape as a result of the user operation.

17. The program product of claim 13, wherein the executable code further comprises code to perform providing the haptic feedback in response to the cursor being located in a predetermined display area of the display as a result of the user operation.

* * * * *